United States Patent [19]

Lender et al.

[11] Patent Number: 4,461,011

[45] Date of Patent: Jul. 17, 1984

[54] METHOD AND APPARATUS FOR CONVERTING BINARY INFORMATION INTO A HIGH DENSITY SINGLE-SIDEBAND SIGNAL

[75] Inventors: Adam Lender, Palo Alto; Henry H. Olszanski, Belmont, both of Calif.

[73] Assignee: GTE Network Systems Incorporated, Phoenix, Ariz.

[21] Appl. No.: 34,321

[22] Filed: Apr. 30, 1979

[51] Int. Cl.³ .................... H04L 25/34; H04L 27/02
[52] U.S. Cl. ........................................ 375/18; 375/39; 375/43
[58] Field of Search ............... 340/347 DD, 146.1 A; 325/38 A, 49, 50, 60, 40, 137, 138; 179/15 BC, 15.55 R; 178/68; 375/17, 43, 61, 18, 19, 39, 41; 455/46, 47

[56] References Cited

U.S. PATENT DOCUMENTS

| | | | |
|---|---|---|---|
| 3,443,229 | 5/1969 | Becker | 325/60 |
| 3,588,702 | 6/1971 | Tisi | 325/40 |
| 3,846,583 | 11/1974 | Boulter | 375/43 |
| 4,086,587 | 4/1978 | Lender | 325/38 A |

OTHER PUBLICATIONS

Proceedings of IRE. vol. 44, No. 12, Dec. 1956; pp. 1703–1705; A Third Method of Generation and Detection of Single Sideband Signals, Donald K. Weaver, Jr.

Primary Examiner—Benedict V. Safourek
Attorney, Agent, or Firm—Leonard R. Cool

[57] ABSTRACT

An incoming bit stream is digitally processed to obtain both in-phase and quadrature-phase 7-level correlative signals. The two 7-level correlative signals are separately band limited to a passband having a bandwidth that is about ⅛th of the bit rate of the original bit stream, and these band limited signals are then separately analog modulated, respectively, using in-phase and quadrature-phase components derived from a line carrier oscillator. The modulation products are then combined in a summing circuit to derive a signal-sideband 7-level correlative signal.

8 Claims, 12 Drawing Figures

METHOD AND APPARATUS FOR CONVERTING BINARY INFORMATION INTO A HIGH DENSITY SINGLE-SIDEBAND SIGNAL

CROSS-REFERENCE TO RELATED APPLICATION

A. Lender application Ser. No. 34,320, dated Apr. 30, 1979, entitled "Method And Apparatus For Converting Binary Information Into A Single-Sideband 3-Level Correlative Signal."

BACKGROUND OF THE INVENTION

1. Field of the Invention

This invention relates to the transmission of digital information, and more particularly relates to the use of correlative techniques in combination with digital and analog modulation processing to generate a single-sideband signal in which the number of bits transmitted per hertz of bandwidth is increased to four.

2. Background Description

The three basic techniques which may be used in analog modulation processing for the generation of single-sideband signals are well-known. These three basic techniques are described in an article by Donald K. Weaver, Jr., "A Third Method of generation and detection of single-sideband signals," Proceedings of the IRE, Vol. 44, No. 12, December 1956, pages 1703-1705. Such techniques have not been previously applied to digital signals. Memoryless techniques are out of the question for single-sideband signals since they contain dc and most of the energy is concentrated near the low frequency end of the spectrum. To remedy this disadvantage would require elimination of the dc and low frequency at the transmitter plus the use of quantized feedback at the receiver in order to re-introduce the dc and low frequency components. This would require techniques which are too cumbersome and complex for a multi-level waveform.

The modulation techniques which have been employed in digital transmission systems in the prior art are generally referred to as amplitude-shift keying (ASK), phase-shift keying (PSK), or frequency-shift keying (FSK). None of these digital modulation techniques have been amenable to single-sideband transmission. Because of this, a part of the improvement in bandwidth compression which may be obtained through PSK or correlative level coding techniques is lost since the signal generated for transmission in such systems is in effect double sideband.

SUMMARY OF THE INVENTION

Method and apparatus for generating a single-sideband signal from a serial bit stream which includes digital signal processing of the bit stream to obtain separate in-phase and quadrature-phase 7-level correlative signals; separately band limiting the 7-level signals; analog modulating the band limited in-phase and quadrature-phase 7-level correlative signals, respectively, with in-phase and quadrature-phase components of a line carrier frequency; and, summing the analog modulation products to derive the single-sideband signal.

DETAILED DESCRIPTION OF THE INVENTION

Figure 1:
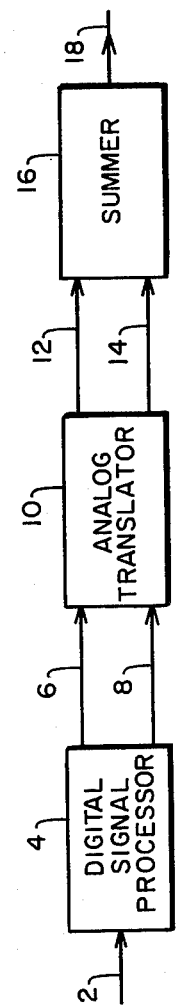
FIG. 1 is a block diagram showing the basic elements of the preferred embodiment of the invention.

Referring now to FIG. 1, digital signal processor 4 converts the binary information appearing on path 2 into an in-phase 7-level signal which appears on path 6 and a quadrature-phase 7-level signal which appears on path 8. Analog translator 10 accepts the 7-level signals on paths 6 and 8, separately band-limits these signals, separately modulates the in-phase 7-level signal with an in-phase component of the line carrier frequency, and the quadrature-phase 7-level signal with a quadrature-phase component of the line carrier frequency. Both line frequency components are obtained from a carrier oscillator using conventional techniques. By use of these modulation processes double-sideband in-phase and quadrature-phase signals are obtained and these appear on paths 12 and 14, respectively. These double-sideband signals are next applied to a summing arrangement 16 where they are combined to obtain a single-sideband signal which appears on path 18. Such summing devices are conventional and will not be further discussed here.

The manner in which the various processes are implemented is discussed in more detail below. In order to simplify the discussion, these various processes will be described with respect to a particular example in which the input serial bit rate, K, of the binary input signal on path 1, will be 12.624 Megabits/sec. (MBS). Several clock frequencies are necessary as will be apparent later. For the chosen bit rate K=12.624 MBS, the following frequencies in the form of square waves are employed:

T1—12.624 MHz
T2—6.312 MH
T3—1.578 MHz @ 0° phase
T4—1.578 MHz @ 90° phase

Figure 2:
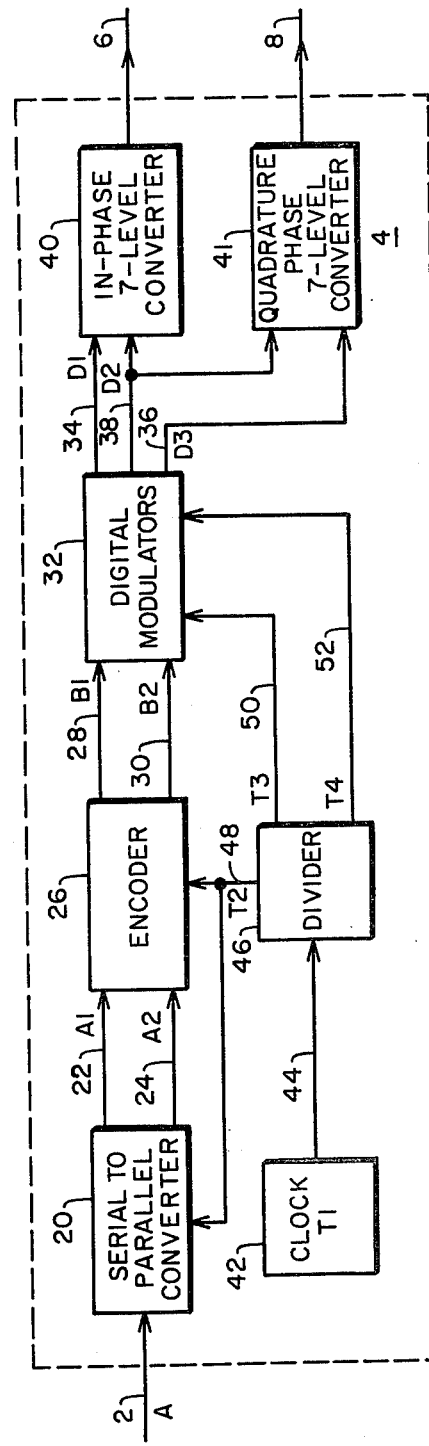
FIG. 2 is a more complete block diagram of digital signal processor (4)

Referring now to FIG. 2, the 12.624 MBS serial binary signal enters serial-to-parallel converter 20 and is converted into two parallel bit streams A1 and A2 each at 6.312 MBS on paths 22 and 24, respectively. The timing of the input bit stream A will have been synchronized to the T1 clock signal before entering the digital signal processor. Such synchronizing circuits are conventional and will not be described here. A parallel converter, such as 20, may consist of a two-state shift register having a serial input and a parallel output at clock rate T2. The first (odd numbered) bit of each pair read into the shift register is considered to be the most significant bit (MSB) of the pair and the bit stream in which the MSB's appear is the one designated A1 (this is graphically illustrated in FIG. 5). The second (even-numbered) bit of each pair is the least significant bit (LSB) and the bit stream in which the LSB's appear is designated A2. The A1 and A2 parallel bit streams are applied to separate input terminals of encoder 26.

Figure 3:
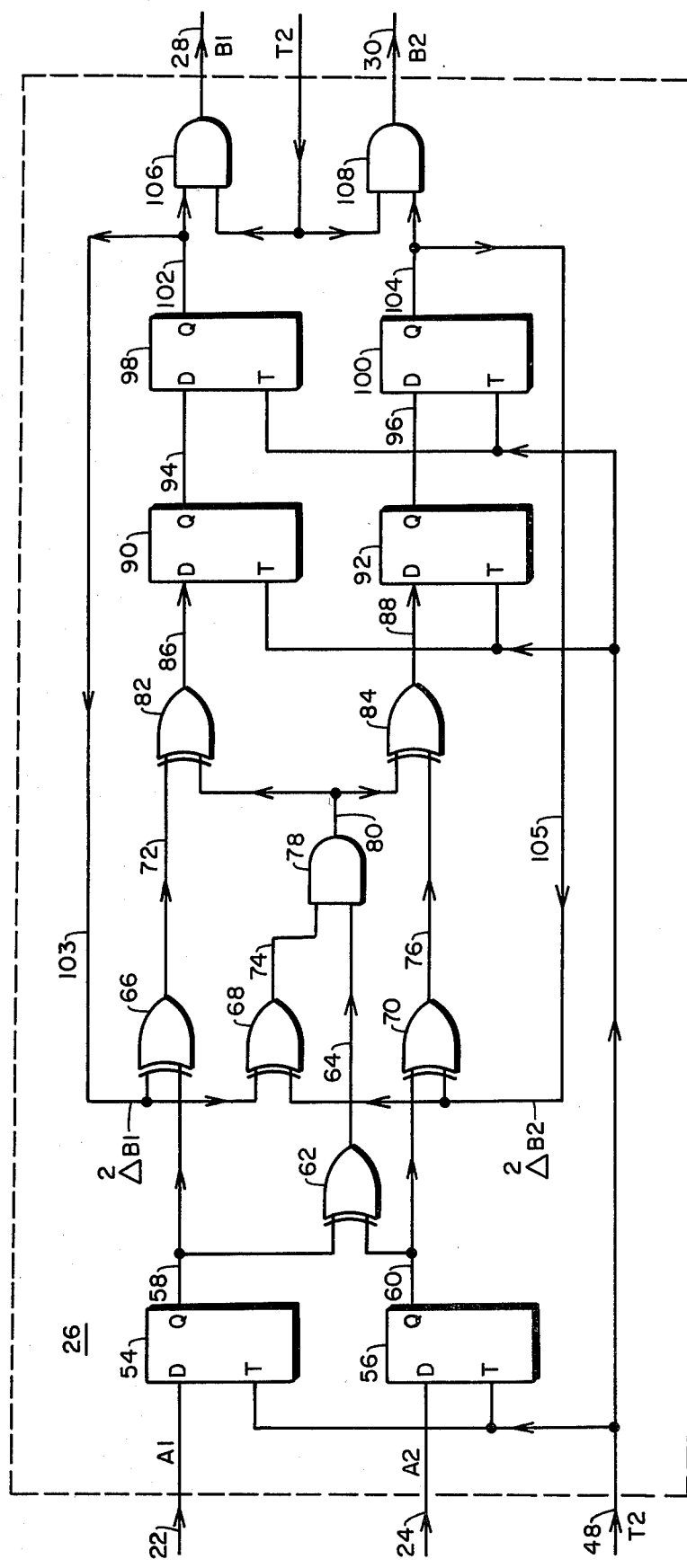
FIG. 3 is a logic circuit diagram of binary encoder (26) used in the preferred embodiment of the invention.

Referring now to FIG. 3, the operation of encoder 26 may be understood. The parallel bit streams A1 and A2 are applied, respectively, to D-type flip-flops 54 and 56 which are enabled by clock pulse T2 on path 48 so as to simultaneously apply the A1 and A2 parallel bit streams, respectively, to paths 58 and 60. Exclusive-OR gate 62 accepts the retimed A1 and A2 bit streams and provides a modulo-2 addition of same on path 64 to one input of AND-gate 78. Exclusive-OR gate 66 accepts the retimed A1 parallel bit stream on path 58 as one input and the delayed encoded output $\dot{\Delta}B1$ as the other input, and provides a modulo-2 addition of same on path 72 which is one input to Exclusive-OR gate 82. The symbol $\Delta$ is used to indicate that a delay of one unit at the 6.312 MBS rate has been effected and $\ddot{\Delta}$ indicates a delay of two such units. Thus, $\ddot{\Delta}B1$ means that the encoded binary signal B1 has been delayed by two units. Also, Exclusive-OR gate 68 accepts the $\ddot{\Delta}B1$ input as well as the encoded delayed $\ddot{\Delta}B2$ output and provides a modulo-2 addition of same on path 74 which is the second input to AND-gate 78. The output of AND-gate 78 is applied via path 80 as a second input to Exclusive-OR gate 82 and also as one input to Exclusive-OR gate 84. Exclusive-OR gate 82 accepts the modulo-2 output of Exclusive-OR gate 66 and the output of AND-gate 78 and provides the present B1 encoded output on path 86. The encoded B1 binary signal is next applied to the D-input of the first of a pair of D-type flip-flops 90 and 98. Each of the flip-flops is enabled by the 6.312 MBS T2 clock input on path 48. Thus, the B1 output is delayed by one bit interval by each flip-flop of the pair at the T2 clock rate so that the delayed encoded signal $\ddot{\Delta}B1$ appears on path 102. The B2 encoded output is similarly derived.

Figure 5:
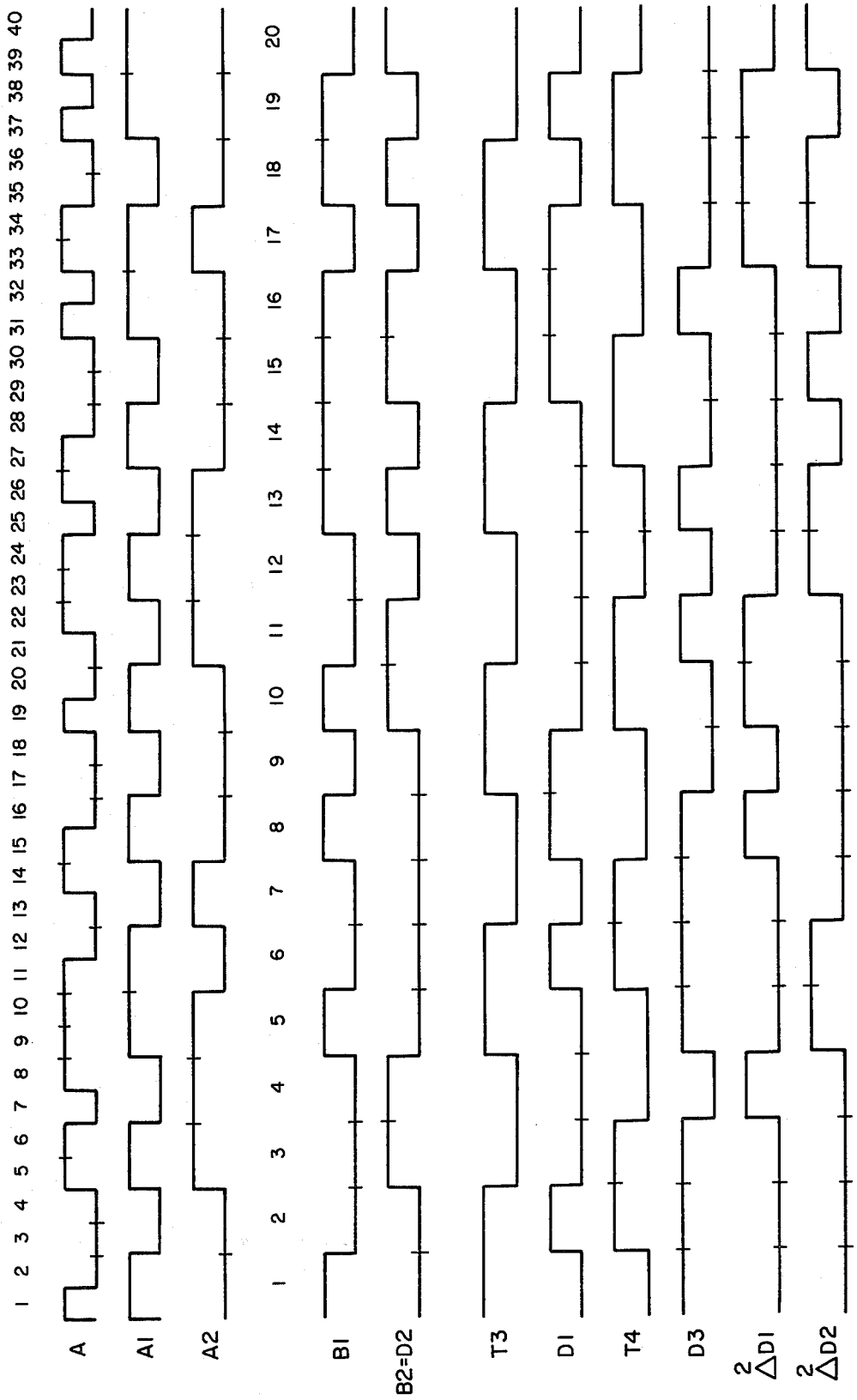
FIG. 5 is a pulse diagram showing the effect of the encoding of waveforms A1 and A2 to obtain waveforms B1 and B2; and the effect of digital modulation on waveform B1 resulting in waveforms D1 and D3.

At this point, we consider the output of flip-flops 98 and 100 to be B1 and B2, respectively, and not $\ddot{\Delta}B1$ and $\ddot{\Delta}B2$ because the delay occasioned by the pairs of flip-flops is not relevant to the subsequent processing of the encoded B1 and B2 bit streams. Thus, waveforms B1 and B2 shown in FIG. 5 are shown as being directly related to the A1 and A2 bit streams. However, for the encoding process shown in FIG. 3, the outputs of flip-flops 98 and 100 are considered to be $\ddot{\Delta}B1$ and $\ddot{\Delta}B2$, respectively. For this reason, these symbols are shown on feedback paths 103 and 105. AND-gates 106 and 108 ensure the correct timed output of the encoded B1 and B2 bit streams on paths 28 and 30, respectively. The encoder outputs B1 and B2 in FIG. 3 can also be expressed as Boolean functions of A1 and A2 as follows:

$$B_i = A_i \oplus \ddot{\Delta}B_i \oplus [(A_1 \oplus A_2) \cdot (\ddot{\Delta}B_1 \oplus \ddot{\Delta}B_2)]$$

where $i=1, 2$; $\oplus$ represents modulo-2 addition; and $\cdot$ represents the AND function.

Figure 4:
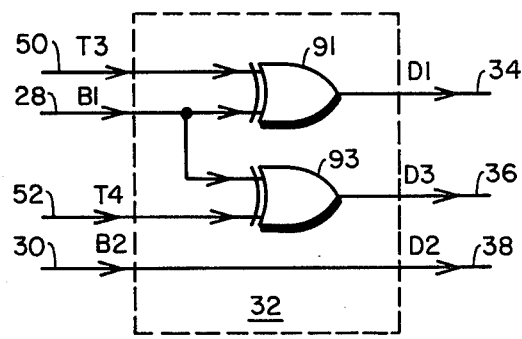
FIG. 4 is a logic circuit diagram of the digital modulators (32) used in a preferred embodiment of the invention.

The encoded bit streams are applied next to digital modulators 32 shown in FIG. 4. Here the encoded bit stream B1 on path 28 is considered to represent the most significant bit at a rate of 6.312 MBS and B2 on path 30 is considered to represent the least significant bit at the same bit rate. Clock timing is supplied at the 1.578 MHz rate by both 0° phase and 90° phase clock signals T3 on path 50 and T4 on path 52. Only the most significant bit B1 is involved in the digital modulation process which consists essentially of modulo-2 addition of the most significant bit, B1, separately with the T3 and T4 clock signals to obtain the D1 and D3 bit streams. The D2 bit stream is the same as the B2 bit stream. The modulation process is shown in FIG. 4 where Exclusive-OR gates 91 and 93 are used to provide the modulo-2 addition. The D1 bit stream on path 34 and the D2 bit stream on path 38 represent the in-phase modulated signal, and the D3 bit stream on path 36 and the D2 bit stream on path 38 represent the quadrature-phase modulated signal. It is to be noted that the effect of the modulo-2 addition is to invert the most significant bit of the pair, i.e., B1, which is equivalent to a 180° reversal of phase. This is similar to what has been called phase modulation except that in this case there is 100% modulation. The following simple tabulation clarifies this modulation process. Also, this modulation process is depicted graphically in FIG. 5 for a particular serial binary input A.

| DIGITAL MODULATION | | | | |
|---|---|---|---|---|
| Input | | | Output | |
| (In-Phase) | | | | |
| B1 | T3 | B2 | D1 | D2 |
| 0 | 1 | 0 | 1 | 0 |
| 0 | 1 | 1 | 1 | 1 |
| 1 | 1 | 0 | 0 | 0 |
| 1 | 1 | 1 | 0 | 1 |
| (Quadrature-Phase) | | | | |
| B1 | T4 | B2 | D3 | D2 |
| 0 | 1 | 0 | 1 | 0 |
| 0 | 1 | 1 | 1 | 1 |
| 1 | 1 | 0 | 0 | 0 |
| 1 | 1 | 1 | 0 | 1 |

Referring again to FIG. 2, it is seen that the in-phase digitally modulated signals D1 and D2 are then applied to in-phase, 7-level converter 40; and the quadrature-phase digitally modulated signals D3 and D2 are then applied to quadrature-phase, 7-level modulator 41. Conceptually, the effect of the conversion process is cosine filtering as represented by $1 + \dot{\Delta}D_i$. The spectral density at the output of this filter is (where $1/T = 6.312$ Mbits/sec.), $$H(\omega) = (1 + e^{-j2\omega T}) = (1 + e^{-j2\omega T})\left(\frac{e^{j\omega T}}{e^{j\omega T}}\right) =$$

$$(e^{j\omega T} + e^{-j\omega T})e^{-j\omega T} = (2 \cos \omega T)e^{-j\omega T} \text{ for } |\omega| \leq \infty$$

Figure 10:
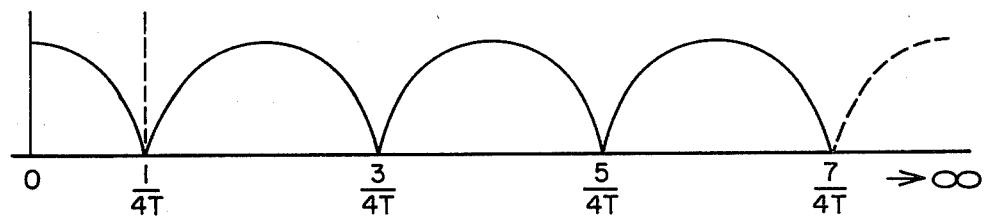
FIG. 10 is a waveform diagram showing the repetitive character of the spectral density resulting from the in-phase conversion process.

The magnitude of the amplitude characteristic $\cos \omega T$ of the digital filter provides a null at one-fourth of the serial bit rate, i.e., at a frequency of $6.312/4 = 1.578$ MHz and, of course, the cosine characteristic is repetitive with increasing frequency extending toward infinity. This is shown in FIG. 10.

Figure 6:
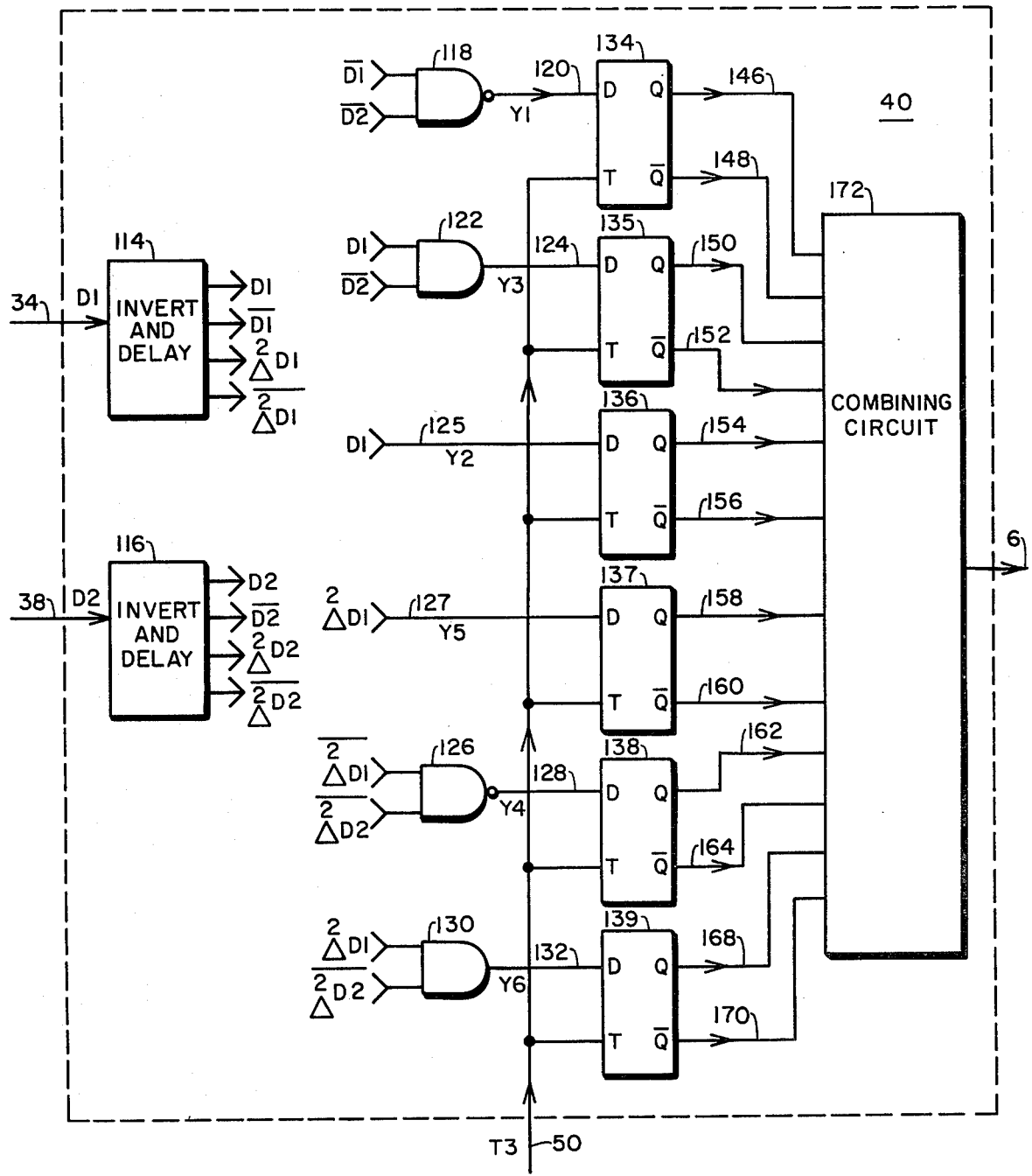
FIG. 6 is a logic circuit diagram illustrating the preferred embodiment of the 7-level converter (40)

Referring now to FIG. 6, invert and delay 114 then takes the D1 output and inverts it to provide $\overline{D1}$ and further delays both the D1 and $\overline{D1}$ signals by two-bit intervals to obtain $\mathring{A}D1$ and $\mathring{A}\overline{D1}$ for use in the 2- to 7-level conversion process. Invert and delay 116 provides the same type of outputs for the least significant bit of the pair, D2. Such invert and delay techniques are well-known and are not further described here. The next step is the actual conversion from 2- to 7-levels using D1 and D2 and the $\mathring{A}D1$ and $\mathring{A}D2$ as illustrated in FIG. 6, and also performing a similar conversion for the D3 and D2 quadrature-phase signal elements. Since a similar technique is used for both conversion processes, the conversion process for the quadrature signal is not shown nor described. However, its operation will be understood from the detailed description of the in-phase conversion process given below.

Following the invert and delay steps the remaining steps in the conversion process comprise (1) the performance of logic functions by the use of AND-gates 122 and 130, and NAND-gates 118 and 126; (2) the derivation of 6 logic states by the use of the logic function output indications and/or the signal elements; and, (3) the combining of the currents resulting from the logic state outputs in combination with the combining circuit 172 so as to derive the appropriate level of the 7-level signal for each bit interval at a K/2 bit rate; where K is the serial input bit rate in MBS. As may be seen in referring to FIG. 6, the binary logic equations which may be used to understand the conversion process are:

IN-PHASE

$Y1 = D1 + D2 \qquad Y4 = \overset{2}{\Delta}D1 + \overset{2}{\Delta}D2$ $Y2 = D1 \qquad Y5 = \overset{2}{\Delta}D1$ $\qquad$ Boolean $Y3 = D1 \cdot \overline{D2} \qquad Y6 = (\overset{2}{\Delta}D1) \cdot (\overset{2}{\overline{\Delta D2}})$ where the + is an OR function, and the · represents AND function.

Further, algebraic addition of the currents is performed, i.e., $$U = \sum_{i=1}^{6} Yi$$

is performed.

QUADRATURE-PHASE

$Y7 = D3 + D2 \qquad Y10 = \overset{2}{\Delta}D3 + \overset{2}{\Delta}D2$ $Y8 = D3 \qquad Y11 = \overset{2}{\Delta}D3$ $\qquad$ Boolean $Y9 = D3 \cdot \overline{D2} \qquad Y12 = (\overset{2}{\Delta}D3) \cdot (\overset{2}{\Delta \overline{D2}})$ Further, algebraic addition of the currents is performed, i.e., $$U = \sum_{i=7}^{12} Yi,$$

is performed.

Figure 8:
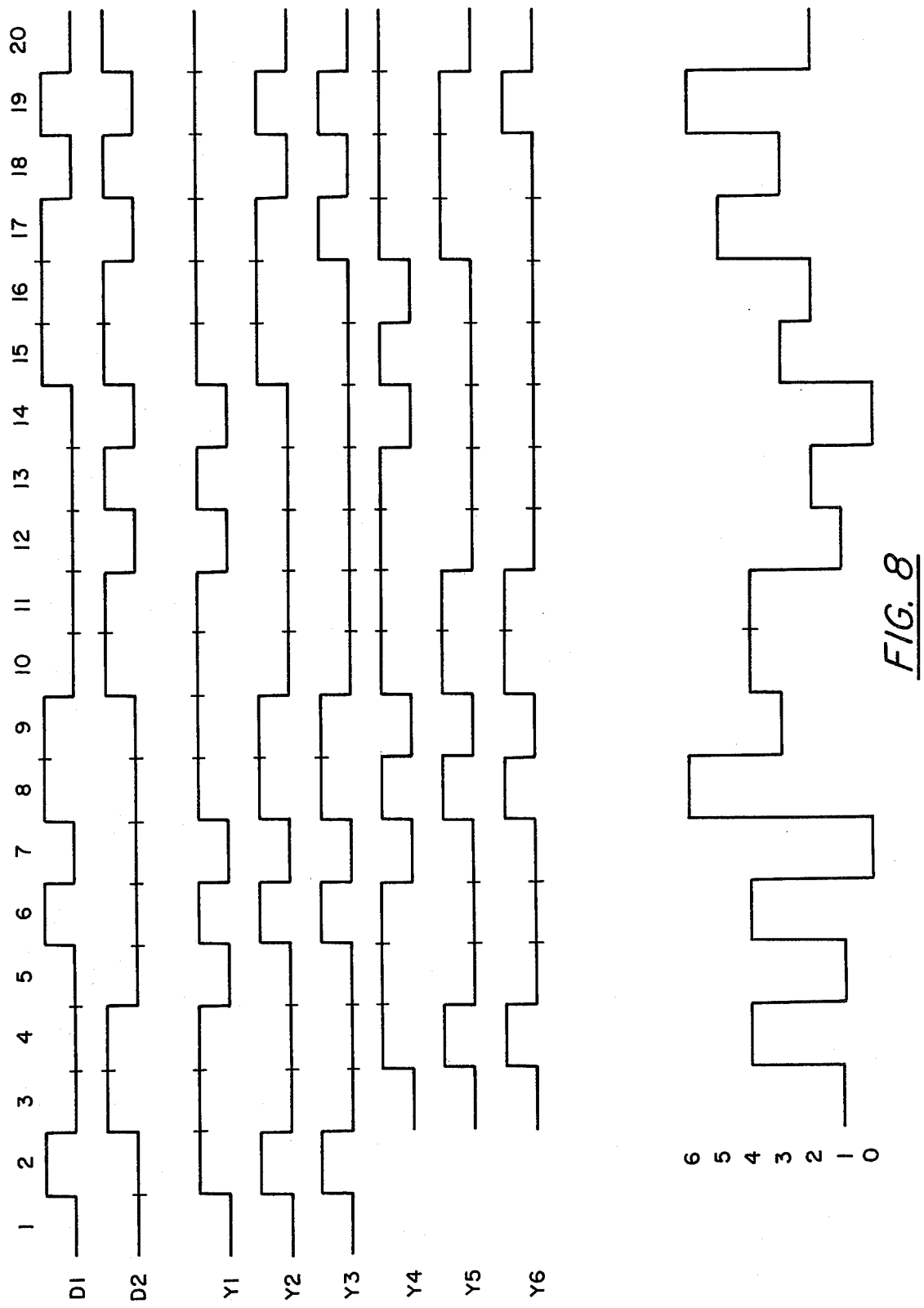
FIG. 8 is a pulse diagram illustrating the process used in converting the in-phase digitally modulated waveforms D1 and D2 into a 7-level correlative signal.

Waveforms representative of the in-phase conversion process, and based on the serial binary input shown in FIG. 5, are shown in FIG. 8. Two points are of interest. First equations Y4, Y5 and Y6 are, respectively, Y1, Y2 and Y3 delayed by two units. Second, a 7-level signal is obtained but it is not duobinary nor modified duobinary at this point. However, this is not important since the additional processing in the transmitter plus standard 7-level recovery techniques will result in the original serial binary signal. For the in-phase conversion, it is to be noted that clock T3 is used to provide the timing for the D-type flip-flops, and thus for the circuit. The clock timing for the quadrature-phase conversion would be provided by clock T4.

A circuit which may be used to accomplish the algebraic combining of $$U = \sum_{i=1}^{6}$$

Figure 7:
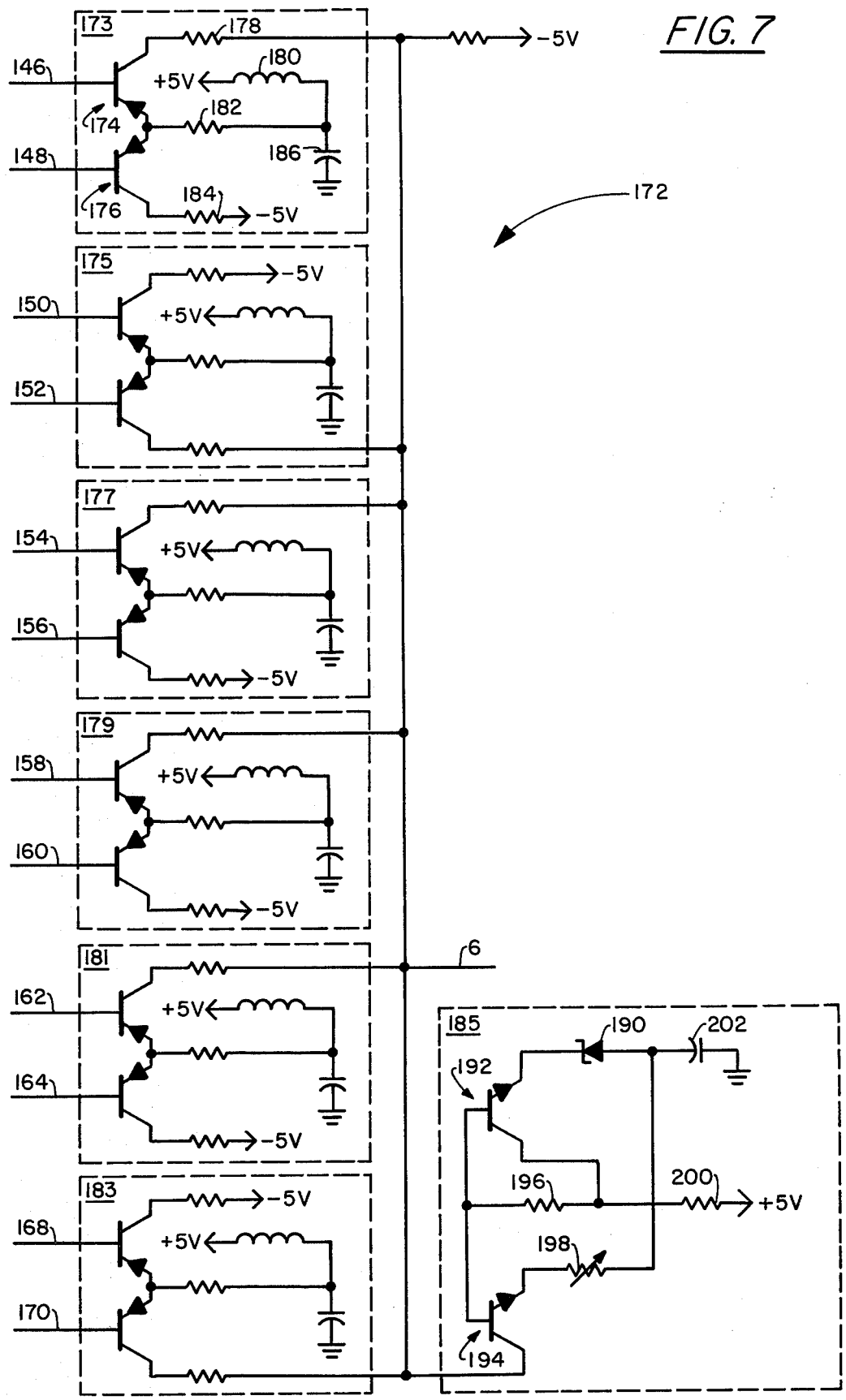
FIG. 7 is a schematic diagram of the combining circuit (172) used in 7-level converter (40)

Yi is shown in more detail in FIG. 7. The summation stage for flip-flop 134 is shown at 173 and its operation is as follows: The two PNP transistors 174 and 176 are used to provide good balance. The voltage available from either Q or $\overline{Q}$ are either below 0.8 V for binary "0" or above 3.5 V for binary "1". When Q is high, transistor 174 is cut off and the output is a −5 V. At the same time $\overline{Q}$ is low so that transistor 176 is turned on to make sure that transistor 174 is cut off. The voltage at the emitter of transistor 176 is 0.8 V (the output of $\overline{Q}$) plus the base to emitter voltage 0.7 V for a total of 1.5 V with respect to ground, i.e., emitter of transistor 176. But the base of transistor 174 is 3.5 V so that transistor 174 is cut off. For the other condition, i.e., Q equals binary "0" and $\overline{Q}$ equals binary "1", Q is roughly 0.8 V and transistor 174 is turned on while transistor 176 is cut off since $\overline{Q}$ is at 3.5 V. In this condition, the output current is approximately 3.5 V ÷ 698Ω. This illustrates the technique of operation and it is to be noted that the remaining stages 175, 177, 179, 181 and 183 operate similarly with respect to their associated flip-flops and the algebraic summation of the current from each stage of the combining circuit 172 provides the apropriate level of the 7-level conversion. It is readily apparent that stages 175 and 133 provide the inverse output for the same input condition because of the manner in which they are connected.

Figure 9:
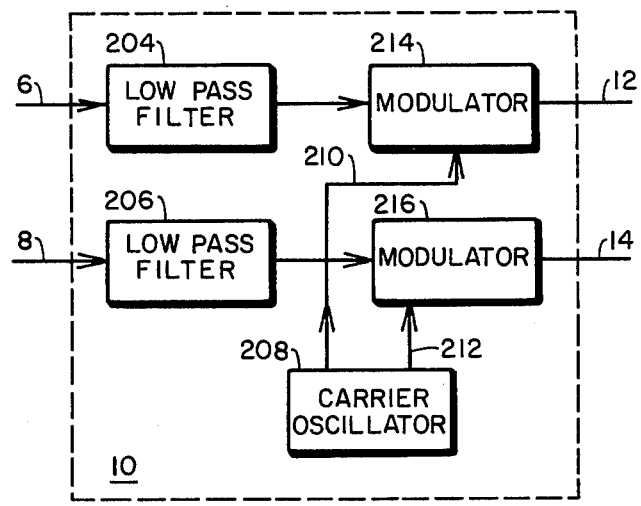
FIG. 9 is a block diagram illustrating in more detail the analog translator (10)
Figure 11:
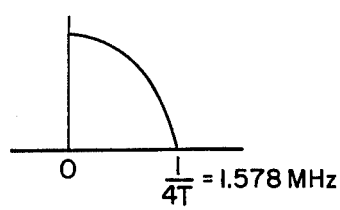
FIG. 11 is a waveform diagram which illustrates the effect of band limiting of the 7-level signal.
Figure 12:
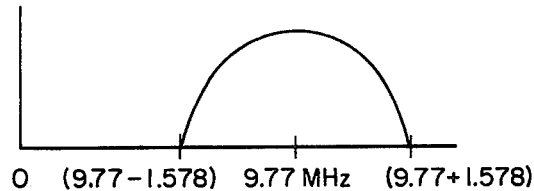
FIG. 12 is a waveform diagram which illustrates the effect of analog translation of the band limited 7-level signals.

The 7-level digital outputs for the in-phase and quadrature-phase digitally modulated signals appear on paths 6 and 8 and are applied next to low-pass band limiting filters 204 and 206, FIG. 9, which are conventional. It should be emphasized that this 7-level signal cannot be interpreted and represents only implicitly the desired 7-level signal. The desired 7-level signal explicitly appears only at the very end of the recovery process at the receiver after demodulation. Because conventional recovery techniques may be employed these are not shown here and do not form a part of the subject invention. This is the only analog band limiting process which is used to provide the single-sideband signal. Each low-pass filter provides a cutoff at a frequency 1.578 MHz where the original serial bit stream has a bit rate of 12.624 MBS, i.e., at one-eighth of the serial bit rate. This is shown in FIG. 11, where the 0 to ¼T spectrum is illustrated, i.e., in our example from 0 to 1.578 MHz. It is to be remembered that 1/T is equal K/2, i.e., one-half the serial bit rate or in our example 6.312 MBS.

Conventional LC filters may be employed or filters using crystals may also be used to provide the analog low-pass filter characteristic. The band limited outputs may be translated to any particular portion of the frequency spectrum, however, for our illustrative example the carrier oscillator frequency provided by oscillator 208 has a frequency of 9.77 MHz. The output of the in-phase carrier oscillator is applied via path 210 to a conventional double-sideband suppressed carrier modulator 214. A quadrature-phase carrier frequency derived from the carrier oscillator is applied via path 212 to a conventional double-sideband, suppressed carrier amplitude modulator 216. Techniques for deriving a quadrature-phase carrier frequency from an oscillator are well-known and, therefore, are not discussed here. Thus the in-phase and quadrature-phase double-sideband suppressed carrier signals appear respectively on paths 12 and 14 where they are applied to a conventional summer 16, as shown in FIG. 1. The in-phase double-sideband signal is shown centered around the 9.77 MHz carrier in FIG. 11. Both sidebands occupy the same bandwidth before summation.

As a result of the summation process, sideband cancellation occurs and a single-sideband signal, which occupies the band from $9.77 \pm 1.578$ MHz, i.e., from 8.192 MHz to 11.348 MHz, is obtained (see FIG. 11). There is a null at each of these extreme frequencies, and it is convenient in many applications to re-introduce and transmit a small amount of carrier reference frequency at either of the nulls to facilitate demodulation at a receiving terminal. It should be noted that the serial binary bit stream, having a bit rate of 12.624 MBS, is sent in the bandwidth extending from 8.192 MHz to 11.348 MHz, thus providing a transmission efficiency of 4 bits per Hz of bandwidth.

It should be noted also that other final carrier modulation frequencies may be employed. For example for transmission over cable or wireline type facilities, a much lower line carrier frequency would be used. However, where the transmission is to be over digital radio the single-sideband signal obtained, as described hereinabove, is normally subsequently translated to a higher frequency before transmission.

While the invention has been particularly shown and described with reference to a preferred embodiment, it will be understood by those skilled in the art that changes in form and detail may be made therein within departing from the spirit and scope of the invention.

What is claimed is:

1. Apparatus for generating a single-sideband signal from a serial bit stream, having a bit rate of K bits per second, which comprises:
    input terminals arranged to accept the serial bit stream;
    a timing circuit which provides clock pulse signals of T2 at a pulse repetition rate of K/2 bits per second, and of T3 and T4 at a pulse repetition rate of K/8 bits per second, T3 being in-phase and T4 being in quadrature-phase with the T2 clock pulse signal;
    means for dividing the serial bit stream into a pair of parallel bit streams, each having a bit rate of K/2 bits per second, the first and second bit streams of the pair being made up, respectively, of the odd and even numbered bits in the serial bit stream, said first bit stream being designated A1 and said second bit stream being designated A1;
    means for encoding said A1 and A2 parallel bit streams to obtain first and second encoded binary bit streams designated, respectively, B1 and B2 each at the bit rate K/2;
    means for digitally modulating the encoded bit streams B1 and B2 with both the T3 clock signal and the T4 clock signal so as to obtain an in-phase digitally modulated signal, and a quadrature-phase digitally modulated signal;
    means for transforming the in-phase and quadrature-phase digitally modulated signals into separate 7-level in-phase and 7-level quadrature-phase signals, respectively;
    a line frequency oscillator arranged to provide in-phase and quadrature-phase line carrier frequency components;
    means for separately analog modulating the in-phase and quadrature-phase line carrier frequency components, respectively, with the in-phase and quadrature-phase 7-level signals; and
    means for summing the modulation products obtained from the in-phase and quadrature-phase analog modulation processes, whereby a single-sideband signal is obtained.

2. A apparatus as set forth in claim 1 wherein said encoding means comprises:
    a logic circuit which accepts the A1 and A2 bit streams, respectively, at first and second input terminals and changes the A1 and A2 bit streams into B1 and B2 encoded bit streams, each at a bit rate of K/2, in accordance with the following logic equation:

$$Bi + Ai \oplus \bar{A}Bi \oplus [(A1 \oplus A2) \cdot (\bar{A}B1 \oplus B2)]$$

where
i = 1, 2
$\oplus$ = modulo-2 addition, and
$\cdot$ = AND-function.

3. Apparatus as set forth in claim 2 wherein said means for digitally modulating comprises:
    a first digital modulator which accepts the encoded bit streams B1 and B2 and the T3 clock pulse signal and inverts the most significant coded bit stream B1 in accordance therewith to obtain a binary signal D1 thereby obtaining an in-phase digitally modulated signal represented by D1 and D2 where D2 = B2; and
    a second digital modulator which accepts the encoded bit streams B1 and B2 and the T4 clock pulse signal and inverts the most significant coded bit stream B1 in accordance therewith, thereby obtaining a quadrature-phase digitally modulated signal represented by D3 and D2.

4. Apparatus as set forth in claim 3 wherein said means for converting comprises:
    means for inverting and delaying the filtered D1, and D3 signals to obtain D1, D2, D3, $\bar{A}D1$, $\bar{A}D1$, $\bar{A}D2$, $\bar{A}D2$, D3 and $\bar{A}D3$ signals;
    a first logic means for deriving 6 binary states in accordance with the following equations:

$Y1 = D1 + D2$ $Y2 = D2$ $Y3 = D1, D2$ $Y4 = \bar{A}D1 + \bar{A}D2$ $Y5 = \bar{A}D1$ $$Y6 = (\bar{D1}) \cdot (\bar{D2})$$

where + is equal to OR function and · is equal to AND function;

a second logic means for deriving 6 binary states in accordance with the following logic equations:

$$Y7 = D3 + D2$$

$$Y8 = D3$$

$$Y9 = D3 \cdot D2$$

$$Y10 = \bar{D3} + \bar{D2}$$

$$Y11 = \bar{D3}$$

$$Y12 = (\bar{D3}) \cdot (\bar{D2})$$

first means responsive to the 6 binary states of said first logic means and clock pulse signal T3 for storing each of the 6 binary states and the complements thereof for one T3 clock interval;

a first combining means responsive to the normal and complementary binary states of said first means for deriving the level of the in-phase 7-level signal;

second means responsive to the 6 binary states of said second logic means and clock pulse signal T4 for storing each of the 6 binary states and complements thereof for one T4 clock interval; and a second combining means responsive to the normal and complementary binary states of said second means for deriving each level of the quadrature phase 7-level signal.

5. Apparatus as set forth in claim 4 wherein said first and second means each comprise six D-type flip-flops.

6. A transmitter as set forth in claim 4 wherein said means for analog modulating comprises:

a first analog low-pass filter having a passband from substantially a zero frequency to a frequency equivalent to K/8, said first low-pass filter having an input arranged to accept the 7-level in-phase digital signal from said first combining means and providing at an output an in-phase band limited signal;

a first amplitude modulator having a first input connected to accept said in-phase band limited signal as the modulation frequency, having a second input connected to accept said in-phase line carrier frequency component as the carrier frequency and providing at a first output an in-phase double-sideband, suppressed-carrier modulated signal;

a second analog low-pass filter having a passband from substantially a zero frequency to a frequency equivalent to K/8, said second low-pass filter having an input arranged to accept the 7-level quadrature-phase digital signal from said second combining means and providing at an output a quadrature-phase band limited signal;

a second amplitude modulator having a first input terminal connected to accept said quadrature-phase band limited signal as the modulation frequency, having a second input terminal connected to accept said quadrature-phase line carrier frequency component as the carrier frequency and providing at a second output a quadrature-phase double-sideband, suppressed-carrier modulated signal.

7. Apparatus as set forth in claim 6 wherein said first digital modulator comprises:

an Exclusive-OR gate accepting at one input terminal the B1 encoded bit stream and at a second input terminal the T3 clock pulse signal so as to obtain a D1 binary signal at a first output terminal.

8. A transmitter as set forth in claim 6 wherein said second digital modulator comprises:

a second Exclusive-OR gate accepting at one input terminal the B1 encoded bit stream and at a second input terminal the T4 clock signal so as to obtain a D3 binary signal at a second output terminal.

* * * * *